United States Patent [19]

Pichat

[11] 4,375,986

[45] Mar. 8, 1983

[54] PROCESS FOR TREATING LIQUIDS WASTES POSSESSING A STRONG ACIDITY

[76] Inventor: Philippe Pichat, 18, rue des Tournelles, 75004 Paris, France

[21] Appl. No.: 252,262

[22] Filed: Apr. 8, 1981

[30] Foreign Application Priority Data

Apr. 9, 1980 [FR] France ............................. 80 07917

[51] Int. Cl.³ .............................................. C04B 1/00
[52] U.S. Cl. ....................................... 106/85; 106/97; 106/117; 106/118; 106/DIG. 1
[58] Field of Search ................... 106/85, 97, 117, 118, 106/DIG. 1

[56] References Cited

U.S. PATENT DOCUMENTS

| | | | |
|---|---|---|---|
| 3,720,609 | 3/1973 | Smith et al. ......................... | 106/109 |
| 4,028,130 | 6/1977 | Webster et al. ............... | 106/DIG. 1 |
| 4,116,705 | 9/1978 | Chappell ........................ | 106/DIG. 1 |

OTHER PUBLICATIONS

Bond, M. S. et al. "Handbook of Environmental Control vol. IV: Wastewater: Treatment and Disposal", pp. 280, 286–287, 290 (1974).

Cassell, E. A. et al. "Solidification of Sludges with Portland Cement", *Journal of the Sanitary Engineering Division,* pp. 15–26, Feb., 19870.

*Primary Examiner*—James Poer
*Attorney, Agent, or Firm*—Browdy & Neimark

[57] ABSTRACT

Waste material having a pH not exceeding 2, and which have previously caused a serious disposal problem, are converted into stable, solid, useful, non-polluting products by first mixing the waste material with fly ash using about 30 to 260 parts of weight of ash for 100 parts of waste material, then neutralizing the resultant mixture using lime or calcium carbonate containing materials, next adding a calcium containing binder such as lime or Portland cement, and then solidifying the resultant mixture.

9 Claims, No Drawings

PROCESS FOR TREATING LIQUIDS WASTES POSSESSING A STRONG ACIDITY

BACKGROUND OF THE INVENTION

The present invention relates to the field of water-rich liquid wastes of various origins, such as industrial, farm and city wastes. It relates more particularly to a process making it possible to transform strong acidic wastes, having a pH of less than 2, into solid materials having great stability with respect to external agents, such as water. These liquid wastes possess a great retention power for polluting elements which are contained in these liquid wastes.

The increasing volume of wastes and residues, of all types, constitutes a problem which is of great concern to manufacturers and municipalities, particularly when one considers the fact that these wastes generally present great danger for the environment and for living beings. This is particularly a problem when these liquid wastes are strongly acidic.

Most often, the only acceptable solution from the economic and ecological viewpoint is to perform a treatment of these wastes, by physical or chemical means to effect solidification thereof. For this purpose, techniques have already been proposed which consist in mixing the waste slurry with suitable proportions of various ingredients, such as Portland cement, sodium silicate containing a setting agent such as lime, gypsum, calcium carbonate, a mixture of lime and pozzolana, gypsum or plaster in admixture with organic resins, or metallurgical slags carried in an alkaline medium in the presence of agents catalyzing the hydration of the slag.

These various processes rather often have offered interesting solutions to the solidification of muddy wastes but they resort to using treating products, as for example, Portland cement or similar products, the production of which involves high energy consumption. Further, they are not suitable in the particular case of treating liquid muds that are rich in water and very strongly acidic.

SUMMARY AND OBJECTS OF THE INVENTION

The present invention aims at solving these specific problems by using treating agents which are, per se, considered to be wastes and pose possible environmental problems if unused. Such treating agents are, however, suited for replacing, in great part, the hydraulic cements used heretofore for the solidification or petrification of wastes.

Because numerous countries are seeking to replace at least a part of petroleum with ground coal, thermal power plants produce increasingly larger amounts of wastes which are known as fly ash. These ashes, consisting of aluminosilicates, essentially contain silica (42 to 69%), alumina (21 to 49%), iron (3 to 13% in the form of $Fe_2O_3+TiO_2$), calcium (2 to 10% in the form of CaO), magnesium and a certain number of trace elements, and $SO_3$ (0.4 to 7%). These vitreous and crystallized ashes contain practically no free lime and relatively little bonded CaO, which distinguishes them from lignite ashes, which are not envisaged in the present invention and which exhibit hydraulic properties. As is known, coal ashes are pozzalanic, i.e., in the presence of, for example, lime, they agglomerate into a hard, compact and very stable material. Pozzalanic type mortars, moreover, have proved their stability since the Roman era.

Indeed, it has already been proposed to use fly ash in admixture with various products such as Portland cement, sodium silicate, and ground blast furnace slag to solidify muds. But, as stated above, the additions to these ashes of calorie-consuming products have been in undesirably large amounts and one of the purposes of the present invention is precisely to considerably reduce the proportions in these products of artificial types of hydraulic cement.

According to the novel process of the present invention, coal fly ashes are mixed with acidic liquid wastes. Subsequently, in one or more stages, the pasty mass is neutralized to a neutral pH and then a moderate amount of binder containing lime is added. The final mortar type product is then preferably deposited at the final site before setting.

Actually, one of the principal ideas in originating the present invention was to conceive a means to activate fly ashes of a pozzolanic type, the chemical reaction of which is very slow, as is known. It was found that contacting them with acidic products constituted an effective means to achieve this activation, even at external temperatures that can go down to 0° C. and less. Further, because of the further development of the above-described process, the difficult problem of eliminating toxic or potentially dangerous acidic wastes has been effectively solved.

The process of the present invention is actually totally different from certain other techniques whereby the wastes to be solidified are first neutralized, if they are acidic, with lime or similar product and mixed with other materials rich in sulfates and/or alumina, for example, fly ash. (See French Pat. No. 71.27555 or corresponding U.S. Pat. No. 3,720,609; French Pat. No. 74.40705 or corresponding U.S. Pat. No. 4,028,130; the article of E. A. Cassell et al, *J. of Sanitary Engineering Division Proceedings of American Society of Civil Engineers*, February 1970, pp. 15–26; U.S. Pat. No. 4,116,705). As will be shown below by comparative examples No. 13a and 13b, these techniques do not make it possible to obtain, at the start, a very fast solidification of highly active acidic liquid wastes which are envisaged by the invention, by using the same amounts of reagent, as in the invention herein.

DESCRIPTION OF PREFERRED EMBODIMENTS

The mixture of acidic wastes and fly ash is performed at regular pressure and temperature, for example, between 15° and 30° C., but it is possible to go down even to 0° C. and less, which is advantageous at the site. Preferably, the operation is performed with stirring, generally by using 30 to 260 parts by weight of ash for 100 parts of waste. The time of contact is a function of parameters, such as stirring, pH, granulometry and chemical composition of the ash, type of reactor used (thermally isolated or not), etc. In practice, this time varies between some dozens of seconds to several weeks but in the case of Vortex type stirring, it is generally between five and twenty minutes. Activation of the fly ash is shown, during mixing, by an exothermic reaction due to neutralization, particularly of the calcium compounds of the ash; the temperature can rise up to 100° C. During activation of the ash as a result of the reaction of the acidic waste with the constituents, such as aluminates, aluminoferrites, silicates, the acidic aqueous solution is enriched with ions. Examples of such ions are calcium, aluminum and silicates. The specific surface of the ash rapidly increases, for example, under the effect of a waste having an activity which corresponds to normal (N) sulfuric acid, an ash with an initial Blaine surface corresponding to 3,100 cm$^2$/g reaches a Blaine surface of 4,100 cm$^2$/g in a minute and in a day, with stirring, a Blaine surface of 7,600 cm$^2$/g. Finally, it was found that, during mixing, the pH, initially near 0, can increase to around a value of 4. Consequently, there is a substantial saving of neutralizing agent during the following phase of the process.

According to the second stage of the process of the present invention, the pasty mass is neutralized in the vicinity of neutrality (pH=7) with lime (quicklime or slaked lime) or a product containing these materials, such as ground limestone or residues having a calcium carbonate base. According to a variation of the process, it is possible to operate in several stages: for example, neutralization to about pH 4 (if this pH is not reached during initial mixing) using a calcium carbonate neutralizing agent and then continuing to attain a neutral pH using lime as neutralizer. Neutralization is accomplished by various precipitation reactions (for example, with added aluminates, silicates, borates, zincates, or phosphates) and also absorption, taking into account the considerable specific surfaces developed.

In the last stage of the process, a calcium binder is added, with stirring, to the pasty neutralized mass. As non-limiting examples of such binders, the following may be used, e.g. quicklime, residues from making quicklime or acetylene, natural hydraulic lime, Portland cement, blast furnace slag, slag cements, etc. This binder addition does not consist in simply coating the polluting elements but gives rise to complex absorption coprecipitation and complexing chemical-physical phenomena.

In practice, the weight ratio fly ash/Ca(OH)$_2$ is kept at least equal to 4 and can be increased up to 10 or 20, for example. For a given waste and operating temperature, solidification of the pasty mass by the binder is performed at a rate that is a function of the formulation and dosages used. In general the petrification time varies from a few hours to one or two days, the operation being checked by using a Vicat needle. At times, it is advantageous to add to the binder a silica sand and/or limestone, or an adjuvant as, for example, raw clay. Further, the reactions can be slowed down, if necessary by the addition of water, as for example, polluted water.

To practice the herein disclosed process, standard means and apparatus can be used. For example, mixing of the acidic waste and ash can be done in a mixer having a planetary movement driven by a turbine. Then the neutralizing reagents and the binder are added in the same apparatus accompanied by strong stirring. The resulting mixture, which has a viscosity of a mortar (for example of the ⅓ Portland cement, ⅓ water and ⅓ sand type), can be subjected to extraction using a sliding trap or an extruder. Preferably, transport of the treated waste takes place during setting and before petrification. It is preferable that, during setting, the mass be compacted or packed to reduce the permeability of the material.

According to a variation of the process, the fly ash can be spread over a terrain, on which the acidic waste may be poured, and over which the neutralizing reagent or reagents and binder may be spread. Homogenization is performed by mixing the materials using a milling machine. The mixture is then compacted using vibrating rollers, which may be mounted an pneumatic tires, or by simply using a bulldozer. This technique can advantageously be used when the petrified material is obviously intended to remain on site.

The process of the invention makes it possible to treat all types of highly acidic liquid wastes, particularly having a pH higher than zero, of any origin, i.e., industrial, mining or urban wastes and of inorganic, organic or biological nature. These wastes may chemically contain metals, such as, for example, copper, iron, zinc, chromium, nickel, manganese, alkali metals, titanium, lead, vanadium, arsenic, antimony, or bismuth, anions such as chlorides, sulfates, sulfites, nitrates, fluorides, bromides, iodides, phosphates, cyanides, sulfides, borates, or thiocyanates, or organic compounds, such as protides, lipids, glucides, various hydrocarbons, etc. Finally, the wastes to be treated may be slightly radioactive.

The invention will be better understood from a detailed description of specific embodiments, cited by way of nonlimiting examples, which relate to the treatment of wastes of various compositions and sources.

ILLUSTRATIVE EXAMPLES

In the following examples, there were treated several types of strongly acidic liquid wastes, the composition of which is indicated in table 1 below, each element being expressed in mg/l $\times 10^3$ and the term COD (chemical oxygen demand) corresponding to the pollution of the waste.

TABLE 1

| N° Waste | pH | Cu | Fe | Zn | Cr | Cd | Ni | Mn | So$_4$ | NO$_3$ | COD |
|---|---|---|---|---|---|---|---|---|---|---|---|
| I | 0 | 2.1 | | 2.6 | 175 | 0.05 | 1.1 | 0.5 | 410 | | 575 |
| II | 0 | 0.22 | 0.90 | 0.40 | 0,35 | 0.001 | 0.5 | 0.005 | 165 | 115 | 550 |
| III | 0 | 9.4 | 81 | 7.6 | 1,6 | 0.038 | 0.65 | 0.65 | | | |
| IV | | 95 | 175 | 1.75 | 35 | 2.2 | 85 | 27 | | 1.5 | 75000 |

The origin of these wastes was as follows: chromeplating shop for I, scouring of stainless steel for II, scouring of iron for III and dangerous industrial waste treatment plant for IV.

Unless otherwise indicated, the various ingredients used were of the following types:
coal fly ash with a composition: SiO$_2$—43%; Al$_2$O$_3$—34%; Fe$_2$O$_3$+TiO$_2$—8.5%; CaO—8.7%; MgO—1.9%; K$_2$O+Na$_2$O—1%; SiO$_3$—1.9%; loss in iron: 9%.

Portland cement: CPA 400 type, without additive.
Metallurgical quality lime
Blast furnace slag: Blaine fineness of about 4,000
Chalk dry content in CaCO$_3$ about 98% and Blaine fineness of 4000
Coarse limestone with dry CaCO$_3$ content of 89% and Blaine fineness of 9,000.

To evaluate the power of retention of the polluting elements in the products obtained according to the invention, a leaching test simulating the effect of stagnant water and the following mode of operation were used: samples of solid materials obtained according to the invention were introduced into open polyethylene pots, 7 cm high and with a 7 cm diameter (volume 150 ml). These containers were placed inside larger polyethylene pots, with an inner diameter of 8.5 cm, an outer diameter of 11 cm and a height of 14.5 cm; these latter pots were filled with distilled water. The unit was kept in the open air at a temperature on the order of 18° C. After at least a week, determinations were made, by known means, of the elements, particularly cations and anions, contained in the distilled water and which were not retained by the solid.

EXAMPLE 1

For about 10 minutes 100 g of waste No. I were stirred with 130 g of fly ash. The temperature, at the end of the mixing, reached 51° C. After neutralization to pH 7 by quicklime (about 6 g of CaO), it was mixed with 20 g of Portland cement.

By leaching tests for a week on a 28 day old sample of the resulting solid, the following results were obtained for the proportions of cations not retained by the petrified mass:

Cu, Fe, Zn, Cr, Cd, Ni, Mn: less than 0.1 mg/l (each)
COD: less than 20.

A crushing strength test on a sample of the same age, after 20 days of contact with distilled water, according to standard AFNOR P. 15-413 gave a crushing strength of 70 bars.

EXAMPLE 2

For about 10 minutes, 100 g of waste No. I were stirred with 140 g of fly ash. The temperature was 54° C. Neutralization to pH 7 with quicklime (5.67 g. of CaO) then followed, then 20 g of blast furnace slag were added.

After leaching under the same conditions as in example 1, the following elements (in mg/l) were found:

Cu, Fe, Zn, Cr. Cd. Ni, Mn—less that 0.1 (each)
$SO_4^{--}$—1.5; $NO_3^-$—6
COD—less than 20
Crushing strength (under same conditions as in example 1)—79 bars.

EXAMPLE 3

After stirring 100 g of waste No. I with 115 g of fly ash for 10 minutes, after which the temperature had risen to 45° C., neutralization was effected by adding quicklime (5.8 g of CaO), then 21 g of quicklime were added as a binder.

The results after leaching, as in example 1, were as follows (mg/l):

Cu, Fe, Zn, Cr, Ca, Ni, Mn—less than 0.1
$SO_4^{--}=0$; COD—less than 20
Crushing strength: 23 bars

EXAMPLE 4

For 10 minutes 100 g of acidic waste No. I were mixed with 122 g of fly ash, the mixture being cooled to maintain a temperature of about 22° C., Neutralization was effected to attain a pH of 7 by the addition of 61.5 g of chalk, then quicklime was incorporated in the mixture as a binder (21 g of CaO).

Under the same conditions as in example 1, the results after leaching were the following (mg/l):

Cu, Fe, Zn, Cr, Cd, Ni, Mn—less that 0.1 each
$SO_4^{--}=0$; $NO_3^-=10$

COD—about 20
Crushing strength—20 bars

EXAMPLE 5

Here 100 g of acidic waste No. II were mixed with 86 g of fly ash for 7 minutes. Neutralization was then effected by adding quicklime, then additional lime (a total of 22.3 g of CaO) was incorporated as a binder.

The results, after leaching as in example 1, were the following:

Cu, Fe, Zn, Cr, Cd, Ni, Mn—less than 0.1 mg/l each.
$SO_4^{--}$—130
Crushing strength—60 bars

EXAMPLE 6

For 30 minutes 100 g of Waste No. II were stirred with 40 g of fly ash. Neutralization was effected using 29.1 g of chalk, then a mixture of quicklime (11 g of CaO) and Portland cement (20 g) was added as a binder. After ten days of leaching, said cation contents remained less than 0.1 mg/l.

Crushing strength was 63 bars.

EXAMPLE 7

A mixture of 100 g of waste No. II was stirred with 101 g of fly ash for 12 minutes. After neutralization to pH 7 using quicklime, a mixture of 14.66 g of quicklime and 12.6 g of Portland cement was introduced as a binder.

After leaching of the sample under the same conditions as in example I, each of said cations was found in negligible amounts, less than 0.1 mg/l.

Crushing strength was 55 bars after keeping the sample under water for 20 days and 33 bars after keeping the sample in the atmosphere at 100% humidity and at a temperature of 8° C.

EXAMPLE 8

A type No. III aqueous waste was worked on by mixing 100 g of this waste with 120 g of fly ash for about twenty minutes. After neutralization, using quicklime (2 g), then the addition of quicklime (2 g) and Portland cement (16 g) as a binder, a petrified solid was obtained after two days, exhibiting approximately the same characteristics as in example 9 below.

Crushing strength was 18 bars.

EXAMPLE 9

For about 10 minutes 100 g of waste No. III was stirred with 21 g of fly ash. Neutralization was effected, and quicklime, totaling 28 g of CaO, was added as a binder.

After leaching the following amounts of cations (ml/g) not retained in the petrified solid were indentified:

Cu, Fe, Cr, Cd, Ni, Mn—less than 0.1 each.
Zn: 1.2.

The crushing strength for a sample of the same after 28 days of aging in contact with distilled water (standard AFNOR P 15-413) was 4 bars.

EXAMPLE 10

For 20 minutes 120 g of fly ash were made to react with 100 g of waste No. III, then neutralization was effected using natural hydraulic lime and the same product (lime) was added, totaling 20 g, as a binder.

After leaching less than 0.1 mg/l of each of the following cations were detected:

Cu, Fe, Zn, Cr, Cd, Ni, and Mn.

EXAMPLE 11

According to another mode of operation, a type No. II waste was left in contact with a third of its weight of fly ash for 48 hours without stirring. Then 100 g of the supernatant liquid phase was extracted and 72 g of fly ash were added, with stirring for 10 minutes. Neutralization was effected using 29.1 g of coarse limestone then several grams of quicklime was added, which functioned as a binder (for a total of 8 g of CaO).

After a week of leaching, it was not possible to detect more than 0.1 mg/l of the cations: Cu, Fe, Zn, Cr, Cd, Ni and Mn.

EXAMPLE 12

There were dissolved 30 g of Waste No. IV, which originally had a pH of 8, in 70 g of waste No. II. The resulting waste had a pH less than 0. This waste was made to react for 7 minutes with 110 g of fly ash. Then neutralization was effected using 3 g of CaO and then 18 g of Portland cement was added. The resulting petrified product had a crushing strength of 18 bars. The cation contents were less than 0.1 mg/l except for copper (2.9 mg/l). The COD had fallen to 650.

In all these examples, the solidification time of the treated waste masses, at regular temperature in an atmosphere of about 70% humidity, was always less than 12 hours except in the case of example No. 8 (two days).

EXAMPLE 13

Comparative tests were performed to show the notable differences in results from using, on the one hand, the prior art technique, above described, for treating wastes with a mixture containing a calcium binder and fly ash (test 13a) and, on the other hand, the process of the invention which in a preliminary phase treats the acidic waste with fly ash before the later stages of neutralization and the addition of binder (test 13b).

Test 13a: At the start 100 g of said type No. II waste, diluted once with water, were used. There were added 8.1 g of slaked lime, 18 g of quicklime (pH then went up to 14) and a dispersion of 180 g of fly ash, with stirring for 5 minutes. The temperature of the mixture reached 45° C. after this time.

The product was allowed to stand, then after 11 hours a penetration test was made with a Vicat needle, weighing 300 g and having a diameter of 4.5 mm. It was found that the needle went completely through the sample; the material therefore had not yet solidified.

After a new period of three and one half days a new penetration test was made with a Vicat needle of 300 g and a diameter of 1 mm. Again the needle went through the material.

After a new period of 8 days, the product was apparently well solidified and then the leaching test described above was made. After submersion in water for a period the sample actually disintegrated and therefore was not stable. Still the proportions of cations from the filtered product were analyzed and the following results were found (in mg/liter):
Cu—0.3; Fe—0.2; Zn—0.3; Cr—0.0; Cd—0.4; Ni—0.5.

Test 13b: To 100 g of the same waste as in test 13a were added 180 g of fly ash. The temperature rose to 62° C. and the reaction was allowed to go on for 60 minutes. It was found that the viscosity of the mixture increased considerably and that the pH reached about 3. After this 60 minute period, 8.1 g of slaked lime and 18 g of quicklime were added. A material, of a viscosity clearly greater than in test 13a, was obtained.

The same penetration tests with the Vicat needle as in test 13a were made after 11 hours and then after three and a half days. It was found that in both cases (4.5 mm, then 1 mm needle) no penetration occurred in the material which, from the 11 hour period, had solidified into an extremely hard mass.

Crushing strength, measured after 20 days of contact with distilled water, was 120 bars; therefore extremely high.

After leaching for a period of 3 weeks, the cations not retained by the petrified mass correspond to the following amounts (in mg/l):
Cu—0.2; Fe—0.1; Zn—0.1; Cr—0.0; Cd—0.0; Ni—0.2.

As can be seen from, these two tests 13a and 13b, only the process of the invention made it possible to rapidly obtain a solidified waste resistant to leaching and retaining its impurities; thus a material with excellent mechanical properties.

EXAMPLE 14

This example aims at showing the advantage, in certain cases, of replacing a part of the fly ash with a material such as clay.

To 100 g of waste No. II, diluted once with distilled water, 130 g of fly ash were added and allowed to react for about 7 minutes. Then 8.09 g of slaked lime and 13 g of quicklime were added, with the reaction mass being stirred for 5 minutes. Finally, 13 g of natural crude clay were incorporated in the mixture.

The mass solidified in about 24 hours and the crushing strength of the solid was 26 bars. After leaching, the amounts of cations detected in the wash water were the following:
Cu—0.2; Fe—0.2; Zn—0.1; Cr—0.0; Cd—0.4; Ni—0.4; Mn—0.4.

It will be obvious to those skilled in the art that various changes may be made without departing from the scope of the invention and the invention is not to be considered limited to what is described in the specification.

What is claimed is:

1. A process for treating liquid wastes diluted in water and possessing strong acidity (pH 2) to obtain stable solid materials that are non-polluting and resistant to water leaching, the process comprising the steps of:
   first, mixing the wastes with coal fly ash to form a pasty mass;
   then, neutralizing the pasty mass to neutral pH; and
   finally, adding a lime-containing substance to obtain a treated product.

2. Process according to claim 1 wherein said step of mixing the wastes and fly ash is performed at regular pressure and at a temperature ranging from below 0° C. to 100° C., using about 30 to 260 parts by weight of ash for 100 parts of the waste.

3. Process according to either claim 1 or 2 wherein said neutralizing step is effected using lime or products containing lime until a pH close to 7 is obtained.

4. Process according to claim 3 wherein said neutralizing step comprises first adding a product rich in calcium carbonate to attain a pH of about 4, and then adding lime to the mixture in an amount sufficient to obtain a pH of neutrality.

5. Process according to claim 4 wherein, in said neutralizing step, said product rich in calcium carbonate consists of a composition selected from the group consisting of ground chalk, ground limestone and residues derived from calcium carbonate base, and wherein said lime consists of either quicklime or slaked lime.

6. Process according to claim 1 wherein said lime containing substance used in said final adding step is selected from the group consisting of quicklime, slaked lime, Portland cement, lime manufacture wastes and blast furnace slags, and wherein the amounts of said lime-containing substance and fly ash are such that there is a ratio of fly ash to $Ca(OH)_2 \geq 4$.

7. Process according to claim 1, wherein, after addition of said lime containing substance, raw clay is added to the mixture.

8. A process in accordance with claim 6 wherein said ratio of fly ash to $Ca(OH)_2$ approximates 10 or more.

9. A process in accordance with claim 1 wherein said treated product is deposited on a final disposal site before setting.

* * * * *